United States Patent [19]

Hansson

[11] Patent Number: 4,881,435
[45] Date of Patent: Nov. 21, 1989

[54] POWER TOOL FOR TWO STEP TIGHTENING OF SCREW JOINTS

[75] Inventor: Gunnar C. Hansson, Stockholm, Sweden

[73] Assignee: Atlas Copco Aktiebolag, Nacka, Sweden

[21] Appl. No.: 146,711

[22] Filed: Jan. 21, 1988

[30] Foreign Application Priority Data

Jan. 27, 1987 [SE] Sweden .................. 8700294

[51] Int. Cl.$^4$ .......................... B25B 23/151
[52] U.S. Cl. ........................ 81/469; 81/477; 173/12
[58] Field of Search .......... 81/467, 469, 470, 473–477; 173/12

[56] References Cited

U.S. PATENT DOCUMENTS

| | | | |
|---|---|---|---|
| 3,696,871 | 10/1972 | Stenbacka | 173/12 |
| 3,739,659 | 6/1973 | Workman, Jr. | 81/470 X |
| 3,965,778 | 6/1976 | Aspers et al. | 173/12 X |
| 4,154,308 | 5/1979 | Goldsberry . | |
| 4,300,641 | 11/1981 | Kinkel . | |
| 4,328,871 | 5/1982 | Gluskin | 81/473 X |
| 4,480,699 | 11/1984 | Elmer | 81/470 X |
| 4,513,827 | 4/1985 | Dubiel . | |
| 4,535,850 | 8/1985 | Alexander | 81/477 X |

FOREIGN PATENT DOCUMENTS 0092127 10/1983 European Pat. Off. .
427441 5/1976 Sweden .
2040768 9/1980 United Kingdom .

Primary Examiner—D. S. Meislin
Attorney, Agent, or Firm—Frishauf, Holtz, Goodman & Woodward

[57] ABSTRACT

A power tool for two step tightening of screw joints comprising a housing (10; 50), a rotation motor supported in said housing (10; 50), an output spindle (13, 54) rotated by said motor and connectable to a screw joint to be tightened, a power transmission including a clutch means (16–18, 25; 58, 60, 67) incorporated between said motor and said output spindle (13; 54), and power supply means connecting said motor to a power source. The clutch means (16–18, 25; 58, 60, 67) comprises a shift means (31; 84, 85) by which the mode of operation of the clutch means (16–18, 25; 58, 60, 67) is shiftable between a torque responsive releasing action during the first, high speed step of the tightening process and a non-releasing action during the second, low speed step of the tightening process, and a release detecting means (23; 83) associated with said clutch means (16–18, 25; 58, 60, 67) and arranged to act upon said power supply means to cause at least a substantial reduction in the power supply to the motor as said clutch means (16–18, 25; 58, 60, 67) is released during the first, high speed step of the tightening process.

2 Claims, 4 Drawing Sheets

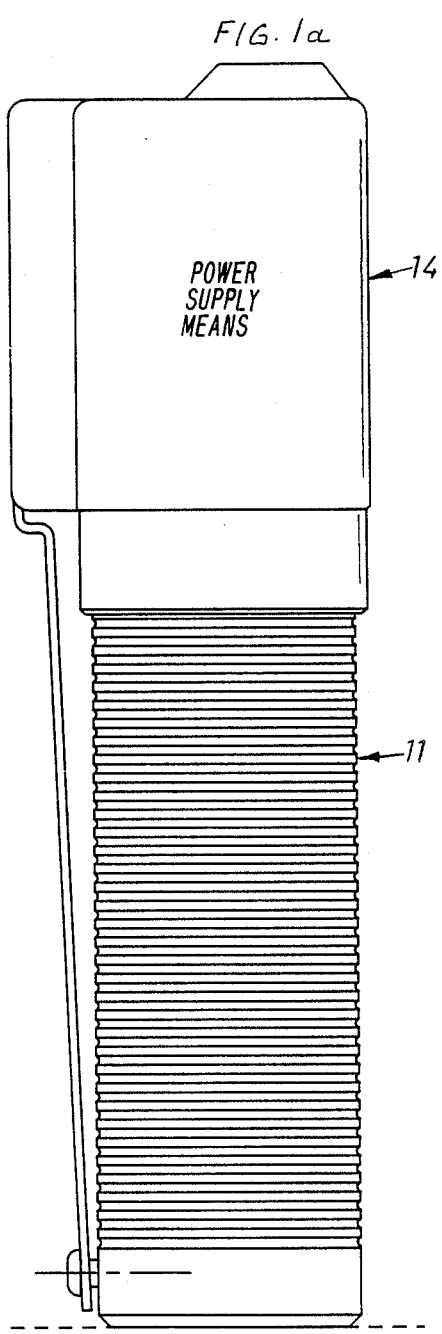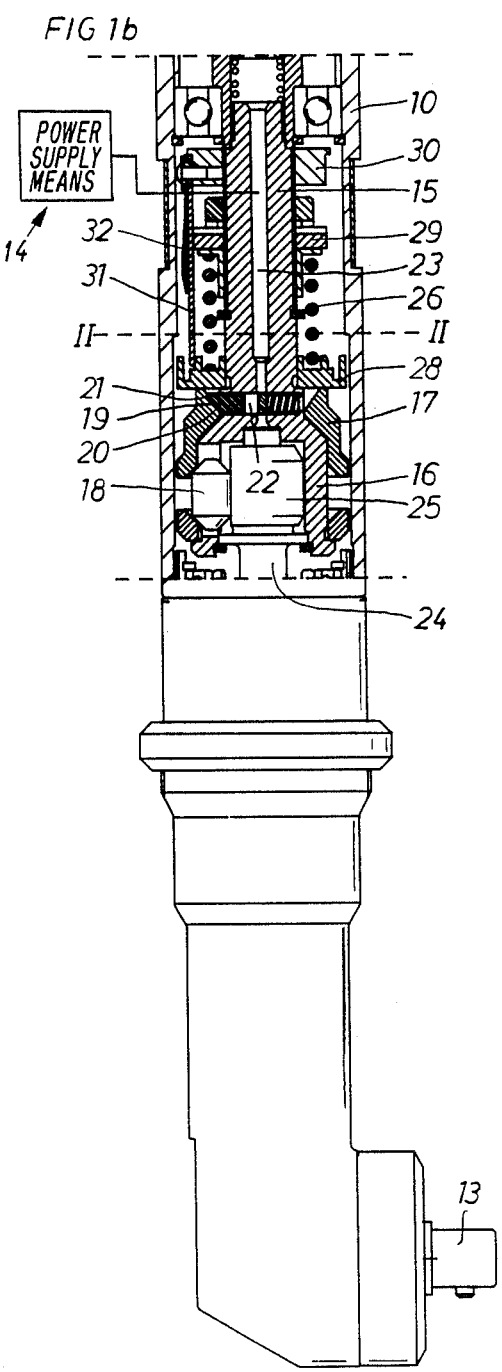
FIG. 1a
FIG. 1b

POWER TOOL FOR TWO STEP TIGHTENING OF SCREW JOINTS

This invention relates to a power tool for two step tightening of screw joints.

BACKGROUND OF THE INVENTION

The problem which is solved by the invention is how to bring down the final torque overshoot at so called stiff screw joints, an overshoot which is caused by the inertia of the rotating parts of the tool. At stiff joints the torque growth takes place very rapidly, because at these joints there is no deformation sequence during which the kinetic energy of the rotating parts of the tool is absorbed before the final torque level is reached. The overshoot problem is particularly significant at electrically powered tightening tools, because the rotating mass of an electric motor is much greater than that of a pneumatic vane motor.

In accordance with this invention the tightening process is carried out in two steps, namely a first, high speed step during which the screw joint is run down and tightened up to a snug level, and a second, low speed step during which the desired final torque level is reached. Since the first step ends at a snug level which is just a fraction of the final torque level the kinetic energy of the fast rotating motor and other rotating parts of the tool has practically no possibility at all to influence upon the final torque level, not even at extremely stiff joints. The result is a tightening tool with a very low mean shift, e.i. a tool which delivers torque with a very small or no difference at all between the installed torque at soft joints and the installed torque at stiff joints.

Two-step tightening is in itself an old and well known technique. For example, in U.S. Pat. No. 3,696,871 there is described a tightening tool having a two-speed gear mechanism which is shifted from a high speed/low torque operation to a low speed/high torque operation as a torque snug level is reached. This shifting of operation mode is accomplished by a torque responsive clutch which at a predetermined torque level disengages, whereby a planetary reduction gearing is engaged in the power transmission to reduce the speed and amplify the torque.

Apart from the fact that this known tool comprises not only a torque responsive release clutch but also a freewheel coupling and an extra reduction gearing, the snug level change of operation into the low speed/high torque mode takes place almost instantaneously, without any intermission in the power supply from the motor of the tool. This means that the inertia forces from the rotating parts "upstream" of the clutch are not at all reduced, but will add to the drive torque as the second tightening step commences. This is a serious disadvantage, because at stiff joints this might cause a substantial over-shoot at the desired final torque level.

Instead of employing a gear shift mechanism as described above, other previously known screw joint tightening systems operate in a two-step mode which is accomplished simply by interrupting the power supply to the tool and terminate the first step at a predetermined threshold torque level and after a certain time intermission restart the tool for a second tightening step. A tightening system of this type is disclosed in U.S. Pat. No. 3,965,778. Neither is a system of this type able to avoid torque overshoot at stiff joints. Due to the inertia forces of the rotating parts of the tool, and due to the fact that a high runningdown speed is always used during the first tightening step, the overshoot at the end of the first step sometimes extends beyond the desired final torque level. The reason is that the torque application on the joint is not discontinued fast enough.

The object of the present invention is to avoid the torque over-shoot problems inherent in the above described prior art.

It is also an object of the invention to provide a power tool for two-step screw joint tightening by which the above mentioned problems are solved and which is of a simple and compact design.

BRIEF DESCRIPTION OF THE DRAWINGS

FIGS. 1a and 1b show together a side view, partly in section, of a power tool according to the invention.

DETAILED DESCRIPTION

Figure 2:
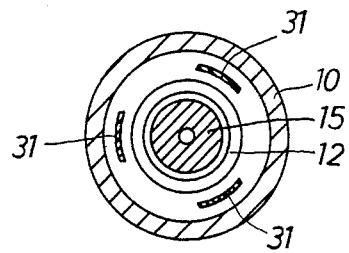
FIG. 2 shows a cross section along line II—II in FIG. 1b.

The tool shown in FIGS. 1a and 1b is an angle nut runner comprising a housing 10 in which is supported a rotation motor 11 (not shown in detail), a power transmission connecting the motor 11 to an output shaft 13, and a power supply means 14 located in the rear end of the housing 10.

The power transmission includes a drive shaft 15 and a clutch means which comprises a driving member 16 and an axially movable yielding element 17 which is preloaded by a spring 26, three conically ended rollers 18 and a transversely displaceable trip element 19. The latter has an oblique end surface 20 and is spring biassed into contact with an oblique surface 21 on the yielding element 17. The trip element 19 is formed with an axially directed aperture 22. A release detecting rod 23 extends axially through the drive shaft 15 and is endwise supported by the trip element 19. A driven shaft 24 is provided with a cam portion 25 which forms the driven member of the clutch means and which cooperates with the rollers 18 to transmit torque to the shaft 24.

Figure 3:
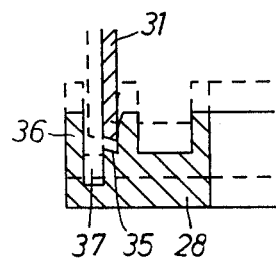
FIG. 3 shows, on a larger scale, a detail of the tool in FIG. 1b.

The torque transmitting clutch further comprises a ring element 28 which is clamped between the spring 26 and the yielding element 17. The pretension of spring 26 is adjustable by means of a nut 29 threaded onto the drive shaft 15. A further ring nut 30 is mounted on the drive shaft 15 and carries three axially directed fingers 31 which at their one ends are pivotally supported on the ring nut 30 and at their opposite ends arranged to endwise abut against the ring element 28. Each of the axially directed fingers 31 is acted upon by a leaf spring 32 so as to urge the fingers radially inwardly. At a certain rotation speed of the clutch, however, the centrifugal forces acting upon the fingers 31 will overcome the preload generated by the springs 32 and make the fingers 31 move outwardly. As seen in FIGS. 2 and 3, the ring element 28 comprises an annular shoulder 35 which is somewhat slanted in relation to a diameter plane and arranged to engage the ends of the fingers 31 which are slanted as well to match the shoulder 35. A circumferential flange 36 of the ring element 28 serves to limit the outward movement of the fingers 31 as the latters are moved outwardly by centrifugal action. Between the shoulder 35 and the circumferential flange 36 there is an annular groove 37 the width of which is somewhat larger than the thickness of the fingers 31, thereby allowing the fingers 31 to be received in the groove 37 and enable an axial movement of the ring element 28.

For carrying out a tightening process, the tool is connected to a screw joint by a nut socket connected to the output shaft 13, and the power supply means 14 is connected to an external power source. During the first step of the tightening process, the torque resistance from the screw joint is very low, which means that the rotation speed of the motor as well as of the clutch means is rather high. This means in turn that a centrifugal action on the fingers 31 is big enough to overcome the preload of the leaf springs 32 and move the fingers radially outwardly into contact with the peripheral flange 36 of the ring element 28. Then the ring element 28 is free to be moved axially since the fingers 31 are receivable in the annular groove 37.

As the torque resistance from the screw joint is increased up to a predetermined snug level, the spring 26 can no longer resist the axial pressure excerted by the rollers 18 upon the yielding element 17 and ring element 28, which results in an axial displacement of the yielding element 17 and the ring element 28 as well as a transverse displacement of the trip element 19. The aperture 22 of the latter is brought into alignment with the release detecting rod 23 which falls down (i.e., is displaced forwarding) and causes the power supply means 14 shut off or at least substantially reduce the power supply to the motor 11. The first step of the tightening process is ended and all the rotating parts of the tool comes to a stand still.

It is to be noted that the motor and other fast rotating parts of the power transmission "upstream" of the clutch are instantaneously separated from the screw joint connected parts of the tool. This is accomplished due to the fact that the rollers 18 override the apex portions of the cam 25 and have to move a further distance before they reassume their torque transmitting engagement with the cam 25. This means that the inertia forces of the rotating parts upstream of the clutch are prevented from causing a torque over-shoot.

As the second step of the tightening process is commenced, by application of power by the power supply means 14, the torque resistance from the screw joint is considerably high and the rotation speed of the power transmission including the clutch means is very low and the fingers 31 remain in their clutch locking positions. This means that the ends of the fingers 31 abut against the annular shoulder 35 of the ring element 28. Hence, the ring element 28 is locked against axial movement and the clutch means is prevented from being released. Since the yielding element 17 is not able to move axially, the rollers 18 can not be moved radially by the cam portion 25 of the driven shaft 24. This means that the second step of the tightening process will not be completed as the result of a release of the clutch means as in the first step but is discontinued as a result of a certain torque level being reached and indicated by torque sensors or by a certain indicated change in the power supply. As an example of the latter, there could be changes in the back pressure from the motor as in the case a pneumatic motor is used, or a certain increase in the current supply to an electric motor in an electrically powered tool.

Accordingly, the spring biassed fingers 31 are arranged to shift the mode of operation of the clutch means from a torque dependant release action to a locked non-releasing action.

An important functional feature of the above described two-step tightening process is that before the second step is commenced there is a deceleration sequence during which the rotational speed of the clutch is decreased to a low level at which the mode of operation is changed from releasable to locked condition. This means that the locked second step could not be started until the rotational speed is low enough to avoid addition of inertia generated forces.

Figure 4:
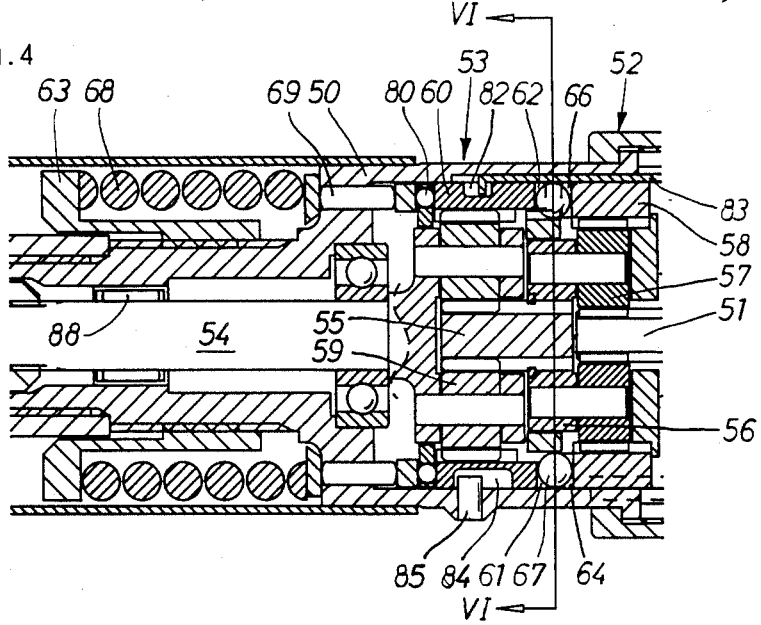
FIG. 4 shows a longitudinal section through a power tool according to another embodiment of the invention.
Figure 5A:
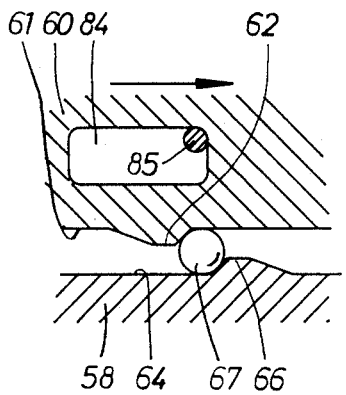
FIGS. 5a-c illustrate schematically the interaction of certain details during operation of the tool.
Figure 5B:
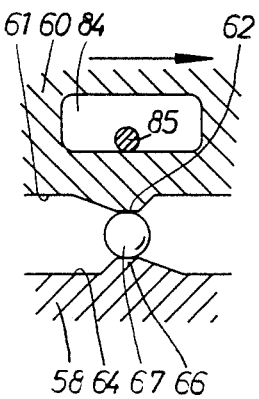
Figure 5C:
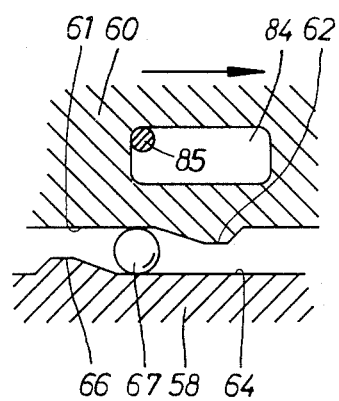
Figure 6:
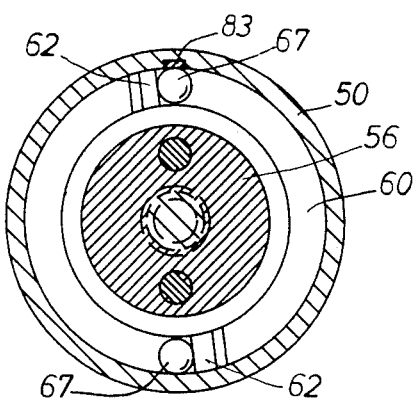
FIG. 6 shows a cross section along line VI—VI in FIG. 4.

The power tool illustrated in FIGS. 4–6 comprises a housing 50 in which is mounted a rotation motor (not shown) which by a drive shaft 51 delivers a torque to a power transmission which includes two planetary reduction gears 52 and 53. The latter is coupled to a driven shaft 54.

The first planetary gear 52 comprises a planet carrier 56, a number of planet wheels 57 and a ring gear 58 immovably mounted in the housing 50. The planet carrier 56 comprises a sun gear 55 for cooperation with the planet wheels 59 of the second planet gear 53. The planet wheels 59 are supported by a planet carrier which is formed in one piece with the output spindle 54. The second planetary gear 53 also comprises a ring gear 60 which is rotatably supported in the housing 50 as well as axially displaceable relative thereto. At its right hand end, the ring gear 60 is formed with a flat annular end surface 61 which is broken by two axially extending teeth 62 which are formed with inclined cam surfaces. See FIGS. 5a–c. The immovable ring gear 58 of the first planetary gear 52 has on its left hand end a flat annular end surface 64 which is broken by two axially extending teeth 66 which, similarly to the teeth 62 on the movable ring gear 60, are provided with inclined cam surfaces. Between the two ring gears 60 and 58 there are employed two balls 67 which together with the flat surfaces 61 and 64 form an axial thrust bearing between the two ring gears. The ring gear 60 is biassed toward ring gear 58 by means of a spring 68 which via axially extending pins 69 and an axial thrust bearing 80 exerts an axial bias force on the ring gear 60. The spring 68 is supported by a flanged nut 63 which is adjustably connected to the housing 50.

The ring gear 60 is formed with two circumferential grooves 82 and 84, one 82 of which is arranged to be engaged by a release sensing element 83 connected to the power supply means of the tool (not shown), whereas the other groove 84 is arranged to cooperate with a radial stud 85 in the housing 50. As is illustrated in FIGS. 5a–c, the groove 84 is larger than the stud 85 both in its axial direction and in its circumferential direction. This stud and groove arrangement is intended on one hand to allow an axial displacement of ring gear 60 during the release sequence of the clutch and on the other hand to limit the rotational movement of ring gear 60 to a certain angular interval after the release sequence.

In operation, the torque supplied by the motor shaft 51 is transmitted via the planetary gears 52 and 53 to the output spindle 54 and further to a screw joint to be tightened. As the torque passes through the second planetary reduction gear 53 a reaction torque is transferred to the ring gear 60. The latter is prevented from being rotated by interengagement of its teeth 12, the balls 67 and the teeth 66 of the stationary ring gear 58. Due to the inclined cam surfaces of the teeth 62 and 66 the ring gear 60 tends to move axially as a result of the transferred torque, but the axial bias force provided by the spring 68 keeps the ring gear 60 in its torque transferring position as illustrated in FIG. 5a. When, however, the reaction torque reaches a certain level which is the snug level representing the end of the first step of the tightening process the axial force developed on the ring gear 60 will exceed the axial load from the spring 68 and cause an axial movement of the ring gear 60. Thereby, the teeth 62 of the ring gear 60 will override the teeth 66 of the stationary ring gear 58. The balls 67 act continuously as a roller bearing between the two ring gears 60, 58. During this overriding sequence, which is illustrated in FIG. 5b, the ring gear 60 is axially displaced away from the stationary ring gear 58 and causes a motion of the sensing element 83 which will influence upon the power supply means of the rotation motor to, thereby, interrupt or at least substantially reduce the power supply to the latter. This axial displacement of the ring gear 60 takes place during a very short period of time though, because as soon as the teeth 62 and 66 have passed each other the ring gear 60 regains its original axial position supporting against the stationary ring gear 58 by means of the balls 67.

After this overriding release sequence, there is a short free running sequence before the end surface of the groove 84 engages the stud 85 and locks the ring gear 60 against further rotation. This is illustrated in FIG. 5c. Accordingly, the ring gear 60 is positively locked against rotation as the second step of the tightening process starts. The second tightening step lasts until a certain torque level is reached. This is indicated by a torque sensor of a conventional type incorporated in the power train of the tool or by a change in the back pressure from the motor in case of a fluid motor being employed or by a certain increase in the electric current in case of an electric motor being employed.

For resetting the clutch mechanism and making it ready for another tightening process, the motor is reversed, and due to the arrangement of a free wheel 88 between the driven shaft 54 and the housing 50 the shaft 54 is locked against rotation in the reverse direction, thereby making the ring gear 60 rotate against its release direction to obtain a reengagement with the ring gear 58 via the teeth 62, 66 and the balls 67.

I claim:

1. A power supply tool for two step tightening of screw joints, the two steps including a first high speed screw joint tightening step and a second low-speed screw joint tightening step, the power tool comprising:
   a housing;
   a rotation motor supported in said housing;
   an output spindle rotated by said motor and connectable to a screw joint to be tightened;
   a power transmission including a releasable clutch means for coupling said motor to said output spindle in an unreleased state and for disconnecting said motor from said output spindle in a released state;
   power supply means coupling said motor to a power source for supplying power to said motor;
   said clutch means comprising:
      a yielding element which is axially movable against the action of a bias spring for releasing said clutch means to its released state to disconnect said motor from said output spindle; and
      shift means responsive to the speed of screw joint tightening for shifting the mode of operation of said clutch means between (i) a torque responsive releasing action whereby said clutch means is able to occupy its released state during the first, high speed screw joint tightening step and (ii) a non-releasing action whereby said clutch means is prevented from occupying its unreleased state during the second, low speed screw joint tightening step;
      said shift means comprising at least one lock finger which is radially movable by centrifugal action during rotation of said motor from (i) an active position in which said at least one lock finger blocks said yielding element against said axial movement, to (ii) an inactive position in which said yielding element is unblocked and free to move axially as a predetermined torque level is reached in said clutch means; and
   release detecting means coupled to said clutch means and to said power supply means for causing said power supply means to at least substantially reduce the power supply to said motor as said clutch means is released to its released state during the first, high speed screw joint tightening step.

2. The power tool of claim 1, wherein:
   said power transmission comprises a corotating and axially immovable support element;
   each of said at least one lock finger has a support end for pivotal mounting on said support element and a butt end for engagement with said yielding element;
   said shift means further includes spring means for biassing said at least one lock finger radially inwardly, toward its active position; and
   said butt end of said at least one lock finger is arranged to support in the active position of said at least one lock finger said yielding element to thereby lock said yielding element against axial movement during said second screw joint tightening step.

* * * * *